F. R. CHASE.
FISHERMAN'S BOB.
APPLICATION FILED FEB. 17, 1919.
1,362,781.
Patented Dec. 21, 1920.
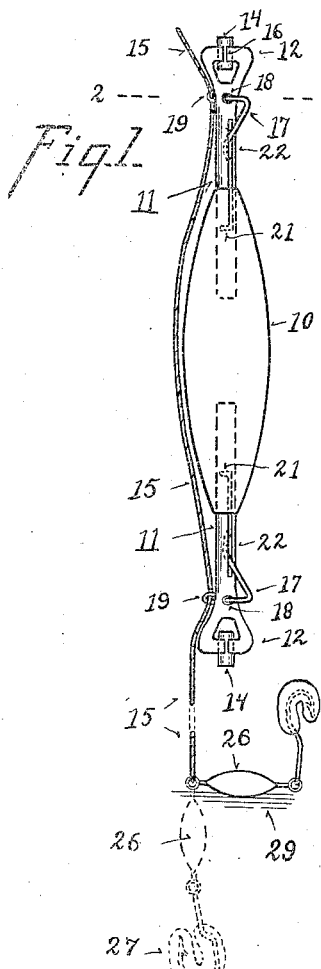
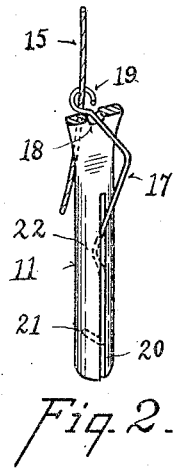
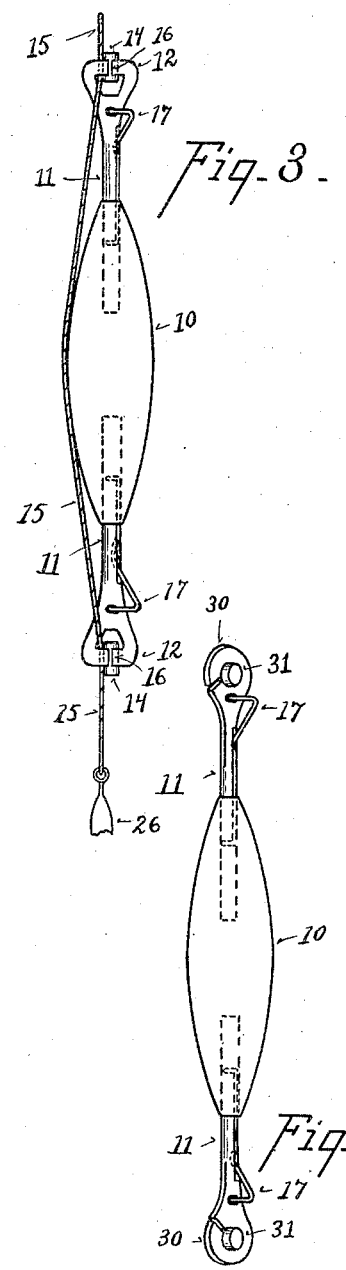
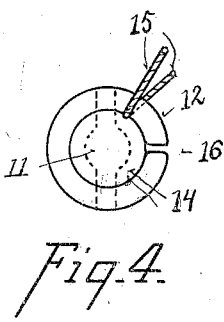
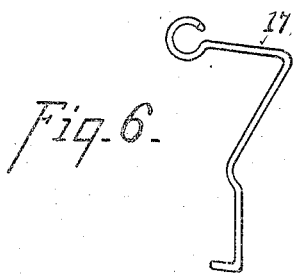
INVENTOR.
Frank R. Chase,
BY C. W. Miles,
ATTORNEY.

UNITED STATES PATENT OFFICE.

FRANK R. CHASE, OF CINCINNATI, OHIO.

FISHERMAN'S BOB.

1,362,781. Specification of Letters Patent. Patented Dec. 21, 1920.

Application filed February 17, 1919. Serial No. 277,612.

*To all whom it may concern:*

Be it known that I, FRANK R. CHASE, a citizen of the United States, residing at Cincinnati, in the county of Hamilton and State of Ohio, have invented certain new and useful Improvements in Fishermen's Bobs, of which the following is a specification.

My invention relates to improvements in fisherman's bobs. One of its objects is to provide improved means to readily connect the bob to a line and disconnect it therefrom. Another object is to provide for a sliding relation between the line and the bob where it is desired that the bait and sinker shall automatically feed the line past the bob until the sinker reaches the bottom. Another object is to provide improved means to secure the bob in fixed relation to the line at any desired position along the line. My invention also comprises certain details of form, combination, and arrangement, all of which will be fully set forth in the description of the accompanying drawings, in which:

Figure 1 is a side elevation of my improved bob illustrated in adjustable relation to the line.

Fig. 2 is a sectional detail on line 2—2 of Fig. 1.

Fig. 3 is a view similar to Fig. 1 illustrating the line in fixed relation to the bob.

Fig. 4 is an enlarged end view of Fig. 3.

Fig. 5 illustrates a modification of the float or bob shown in Figs. 1 and 3.

Fig. 6 is a perspective view of one of the spring wire members detached.

The accompanying drawings illustrate the preferred embodiments of my invention, in which 10 represents a float or bob, which may be of cork or other material light enough to float at the surface of water. At opposite ends of the float member 10 are recesses to receive the stems 11, which stems may be detachably inserted into said recesses in the float, or may be permanently secured therein as desired. As illustrated in Figs. 1 to 4 the stems 11 are provided at their outer ends with split rings 12 in which are inserted cylindrical locking members 14, preferably of cork or similar yielding material. The stems 11 and rings 12 may be composed of aluminum, or other alloy or material preferably of light weight and water-proof nature. When it is desired to attach the float to a fish line 15 in fixed relation thereto, the line is inserted through the split 16 in the ring 12 as illustrated in Figs. 3 and 4 and the locking member 14 given a partial revolution relative to the ring 12, which as illustrated carries the fish line with the locking member 14 away from the slit 16 and locks the cord or line and float in relatively fixed relation. The line is locked in a similar manner at the opposite end of the float. When so locked, the line may if required, but with more or less difficulty, be drawn by hand endwise relative to the float to secure any new or desired adjustment, but the locking action of the members 12 and 14 is sufficiently strong and secure to prevent accidental displacement of the float relative to the line.

I also provide resilient arms or members 17, preferably of spring metal, which at their free ends pass through perforations 18 in the stems 11 and are provided with open eyes or hooks 19, which hooks are held yieldingly closed by being drawn against the face of the stem 11 so as to prevent the line 15 being withdrawn through the opening of the eye as illustrated in Fig. 2. The opposite end of each arm 17 rests in a channel 20 cut longitudinally of the stem 11 and has a shank 21 turned at right angles and seated in a corresponding perforation in the stem 11. This serves to lock the arm 17 rigidly to the stem 11 and prevent it from turning relative to said stem, particularly when the stem and shank of member 17 are inserted into the recess in the float. A knee 22 formed on the member 17 bears against the bottom of the channel 20 to cause the hook 19 to be yieldingly held against the face of stem 11 in position to prevent the escape of the line from the hook 19.

When it is desired to attach a line in adjustable relation to the float the arms 17 are successively sprung toward the stem 11 thereby forcing the eyes 19 away from the stem 11 while the line is being introduced sidewise through the opening into the hook or eye 19, thus providing for attaching the line to the float so that the line may move with comparative freedom endwise through the eyes 19, so that when the fish-hook is lifted from the water the float is not lifted from the water until the line has been drawn endwise through the eyes 19 and the sinker 26 and fish-hook 27 have reached the float, when the three together are lifted from the water. This position of the float, sinker and hook assist in conveniently making the next cast of the line, and as soon as the float reaches the surface of the water, it floats thereon and the sinker and hook serve to feed the line through the eyes 19 of the float until the sinker rests upon the bottom 29 of the body of water where the fishing operation is being carried out, and serving to hold the baited hook as indicated in full line Fig. 1 in substantially the desired position close to the bottom, or at any predetermined position above the bottom, depending upon the length of the connection between the hook and sinker.

Both of the eyes 19 are preferably upon one side of the float to provide for conveniently attaching and detaching the line, so that the line may lead or travel directly from one eye to the other along one side of the float. The float may thus be readily attached and also detached from the line, and held in fixed relation to the line, or held in sliding relation thereto as may be desired.

In the modification Fig. 5 the split rings 30, corresponding to the split rings 12 of Figs. 1 to 4 and locking cylinders 31 corresponding to the locking cylinders 14 of Figs. 1 to 4 are set in a vertical plane relative to the float 10 instead of a horizontal plane as illustrated in Figs. 1 to 4.

The apparatus herein illustrated and described is capable of considerable modification without departing from the principle of my invention.

What I claim is:

1. In combination with a fish-line a float having at each end a split ring and a locking member of resiliently yielding material to yieldingly engage the line between said locking member and the inner wall of said ring.

2. A float provided at opposite ends with stem members, said stem members being each provided with an eye to detachably receive and guide a fish-line endwise relative to the float, and a split ring and resilient locking member fitted to said ring to detachably and yieldingly hold a fish-line in fixed relation to said float.

In testimony whereof I have affixed my signature.

FRANK R. CHASE.